(12) United States Patent
Kinoshita

(10) Patent No.: US 6,981,413 B2
(45) Date of Patent: Jan. 3, 2006

(54) HANDLE STEM AND SPEED INDICATOR

(75) Inventor: Osamu Kinoshita, Sakai (JP)

(73) Assignee: Cateye Co., Ltd., Osaka (JP)

( * ) Notice: Subject to any disclaimer, the term of this patent is extended or adjusted under 35 U.S.C. 154(b) by 0 days.

(21) Appl. No.: 10/455,046

(22) Filed: Jun. 5, 2003

(65) Prior Publication Data
US 2003/0230228 A1 Dec. 18, 2003

(30) Foreign Application Priority Data
Jun. 11, 2002 (JP) ............................. 2002-169559

(51) Int. Cl.
G01P 1/02 (2006.01)
B62J 3/00 (2006.01)

(52) U.S. Cl. ................... 73/493; 74/551.8; 340/432; 429/96

(58) Field of Classification Search .......... 73/493–494; 74/551.1, 551.8; 340/432; D13/103, 106; 429/96, 99
See application file for complete search history.

(56) References Cited

U.S. PATENT DOCUMENTS

| | | | | |
|---|---|---|---|---|
| 4,435,983 A | * | 3/1984 | Shimano | 73/493 |
| 4,489,307 A | * | 12/1984 | Nagano | 340/432 |
| 4,494,854 A | * | 1/1985 | Yamaga et al. | 396/304 |
| 4,751,452 A | * | 6/1988 | Kilmer et al. | 320/106 |
| 5,236,759 A | | 8/1993 | Sakurai | 428/76 |
| 6,069,788 A | * | 5/2000 | Masui | 361/683 |
| 6,192,300 B1 | * | 2/2001 | Watarai et al. | 701/1 |
| D439,561 S | * | 3/2001 | Lee et al. | D13/103 |
| 6,216,060 B1 | * | 4/2001 | Kishimoto | 701/1 |
| 6,305,241 B1 | * | 10/2001 | Masui et al. | 74/551.8 |
| 6,366,052 B1 | * | 4/2002 | Centauro | 320/112 |
| 6,388,871 B1 | * | 5/2002 | Masui | 361/683 |
| 6,430,040 B1 | * | 8/2002 | Masui | 361/683 |
| 6,557,437 B2 | * | 5/2003 | Masui et al. | 74/551.8 |
| 6,584,872 B1 | * | 7/2003 | Kojima | 74/551.8 |
| 6,669,220 B2 | * | 12/2003 | Meggiolan | 280/288.4 |

FOREIGN PATENT DOCUMENTS

| | | |
|---|---|---|
| DE | 692 05 301 T2 | 8/1992 |
| EP | 0 500 078 A1 | 8/1992 |
| EP | 0 560 328 B1 | 9/1993 |
| FR | 2814139 | 3/2002 |
| JP | 57-072479 | 5/1982 |
| JP | 61-030962 | 2/1986 |
| JP | 62-179883 | 11/1987 |
| JP | 02-013677 | 2/1990 |
| JP | 6-37032 | 9/1994 |
| JP | 6-42208 | 11/1994 |
| JP | 09-189708 | 7/1997 |

* cited by examiner

Primary Examiner—Hezron Williams
Assistant Examiner—John Hanley
(74) Attorney, Agent, or Firm—Olson & Hierl, Ltd.

(57) ABSTRACT

A handle stem attached to a head tube of a bicycle includes a speed indicator housed in an indicator housing. The indicator is formed of a body including a circuit board and a liquid-crystal display and a battery housing which is detachable from the body. The body is fixed to the indicator housing and accordingly the speed indicator is attached to the handle stem and the battery housing is freely attachable/detachable. The handle stem and the speed indicator are thus obtained with which batteries are easily replaced without detaching the whole of the indicator from the handle stem.

5 Claims, 6 Drawing Sheets

HANDLE STEM AND SPEED INDICATOR

BACKGROUND OF THE INVENTION

1. Field of the Invention

The present invention relates to a handle stem and a speed indicator for bicycles.

2. Description of the Background Art

FIG. 6 shows a front part of a conventional bicycle. On an end of a forward-projecting part of a handle stem 120 of this bicycle, a handle bar 138 is held. At a position which is located on the upper surface of the forward-projecting part of handle stem 120 and is readily visible from the rider, an indicator-housing recess 134 is provided, and an indicator 135 indicating the speed and the like is fit in this indicator-housing recess 134. A lead 149 extending from the indicator passes through a hollow longitudinal rod 121 and a head tube 107 for example to be connected to a sensor 116. Sensor 116 is formed of a device sensing a magnetic field and thus senses a magnetic flux when a small permanent magnet 115 turns to pass near sensor 116. Although lead 149 passes through within longitudinal rod 121 in order not to be visible from the outside, lead 149 may be wound around head tube 107 so as to be visible from the outside.

FIG. 7 is a cross-sectional view along line VII—VII in FIG. 6. Handle stem 120 as shown includes hollow longitudinal rod 121 having its lower part inserted into the head tube of the bicycle, forward-projecting part 122 extending forward from the upper end of longitudinal rod 121, and a handle-bar holding part 123 provided at the front end of forward-projecting part 122. Handle-bar holding part 123 has a through hole 139 for passing handle bar 138 therethrough, so that handle bar 138 can be passed through the through hole 139 to be fixed to forward-projecting part 122 of handle stem 120.

Handle stem 120 has an insert member 124 which is inserted through the lower end of longitudinal rod 121 and moved upward so as to fix longitudinal rod 121 to a front fork stem of the bicycle. Handle stem 120 further has a lifting rod 126 extending through longitudinal rod 121 and insert member 124 for moving insert member 124 upward.

Insert member 124 which is screwed onto an external thread of the lifting rod engages with the lifting rod and longitudinal rod 121 in such a manner that the lifting rod is not easily rotated. Rotation of the lifting rod thus causes the insert member to move upward and accordingly expand the lower end of the longitudinal rod. Then, the longitudinal rod has the expanded lower end with the outer surface accordingly opened and is thus fixed to the front fork stem.

Forward-projecting part 122 is preferably flat-shaped and has its upper surface provided with recess 134. Indicator 135 indicating the speed and the like is housed in this recess 134. The lower surface of recess 134 has a fixing hole 136 which passes therethrough to reach the lower surface of forward-projecting part 122. Fixing hole 136 is used for fixing indicator 135 to recess 134. Specifically, as shown in FIG. 7, a fixing screw 137 is inserted into fixing hole 136 from below forward-projecting part 122 and screwed in an internal thread on the bottom wall of the indicator. The fixing screw is thus screwed to fix the indicator to recess 134.

Indicator 135 has its body in which a battery is housed for supplying electric power for a liquid-crystal display and a semiconductor device performing various operations. Lead 149 drawn from the indicator is passed through a through hole made along the axis of the lifting rod and connected via a connector in the head tube (not shown) for example to a lead extended from the sensor of a speedometer or the like.

With the above-discussed structure, the rider can check the speed, the traveled distance and the like that are indicated on the indicator while riding the bicycle.

The conventional indicator described above, however, requires such tools as driver and spanner for detaching the indicator. The rider normally rides a bicycle without carrying such tools. Therefore, the place where attachment/detachment of the indicator is done for replacement of the battery for example is limited to a particular place. Moreover, if the rider carries tools, the total weight increases which is not preferable for running of the bicycle. In addition, in order to detach the indicator, the whole of the indicator has to be detached from the handle stem without exception. If the entire indicator is detached each time the battery is replaced, the detachment should frequently be done, resulting in a higher possibility of occurrence of break and contact failure of the lead.

SUMMARY OF THE INVENTION

An object of the present invention is to provide a handle stem and a speed indicator with which a battery can be replaced easily without the need for detachment of the whole of the indicator from the handle stem.

A handle stem according to the present invention is a handle stem attached to a head tube of a bicycle. The handle stem includes a speed indicator and an indicator housing which houses the speed indicator. The speed indicator is formed of a body including a circuit board and a liquid-crystal display and a battery housing which is detachable from the body. The body is fixed to the indicator housing and accordingly the speed indicator is attached to the handle stem and the battery housing is freely attachable/detachable.

With this structure, a battery can be replaced without detaching the body of the indicator. Then, no tool is required and thus one of factors for occurrence of break and contact failure of a lead can be removed. The position where this indicator is attached to the handle stem is usually at the forward-projecting part of the handle stem and thus the display screen is placed on the upper surface which is easily visible from the rider holding the handle. The position where the indicator is attached, however, is not limited to the forward-projecting part. Moreover, the body may be fixed to the indicator housing with an adhesive or may be detachably fixed thereto with a screw or the like. In addition, the lead which electrically connects the sensor to the speed indicator may be placed to pass through the handle or placed outside the handle stem and the head tube.

Indications on the indicator described above include indications of speed, traveled distance from a predetermined point, pulsation and the like. The pulsation is indicated by receiving a pulsation signal transmitted by radio. Further, the time passed from a predetermined point of time may be indicated. On the indicator, one measurement may be indicated, a plurality of measurements may be selected to be indicated, or a plurality of measurements may be indicated to be seen at a time.

The placement of the battery housing is not limited to the one which allows the battery housing to be attached/detached from below. The battery housing may be placed on the upper surface of the handle stem where the display screen of the indicator is placed or placed on a lateral side.

The indicator housing has an upper portion which is a recess in which the body of the indicator is housed and has a lower portion which is a through hole coupled to the recess, so that the battery housing can be exposed downward from the through hole.

With this structure, the battery housing is placed within and below the handle stem and thus only the indicator can be placed on the upper surface of the handle stem that is easily viewable from the rider. Therefore, the handle stem having the speed indicator placed thereon can be improved in terms of design. Moreover, a hand may be inserted from below the handle stem to touch the battery housing. Therefore, the battery housing can easily be detached/attached from the bottom of the body of the speed indicator.

The body may be fixed to the handle stem to be unable to be attached/detached.

Accordingly, it is possible to lessen the risk, for example, that the body is stolen.

An indicator according to the present invention is an indicator which is attached to a handle stem of a bicycle. The indicator is formed of a body including a circuit board and a liquid-crystal display and a battery housing which is detachable from the body, and has fixing means for fixing the body to the handle stem.

As the fixing means, fixing means which is freely attachable/detachable, screw fixing means by means of bolts for example, or bonding fixing means by means of an adhesive may be employed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
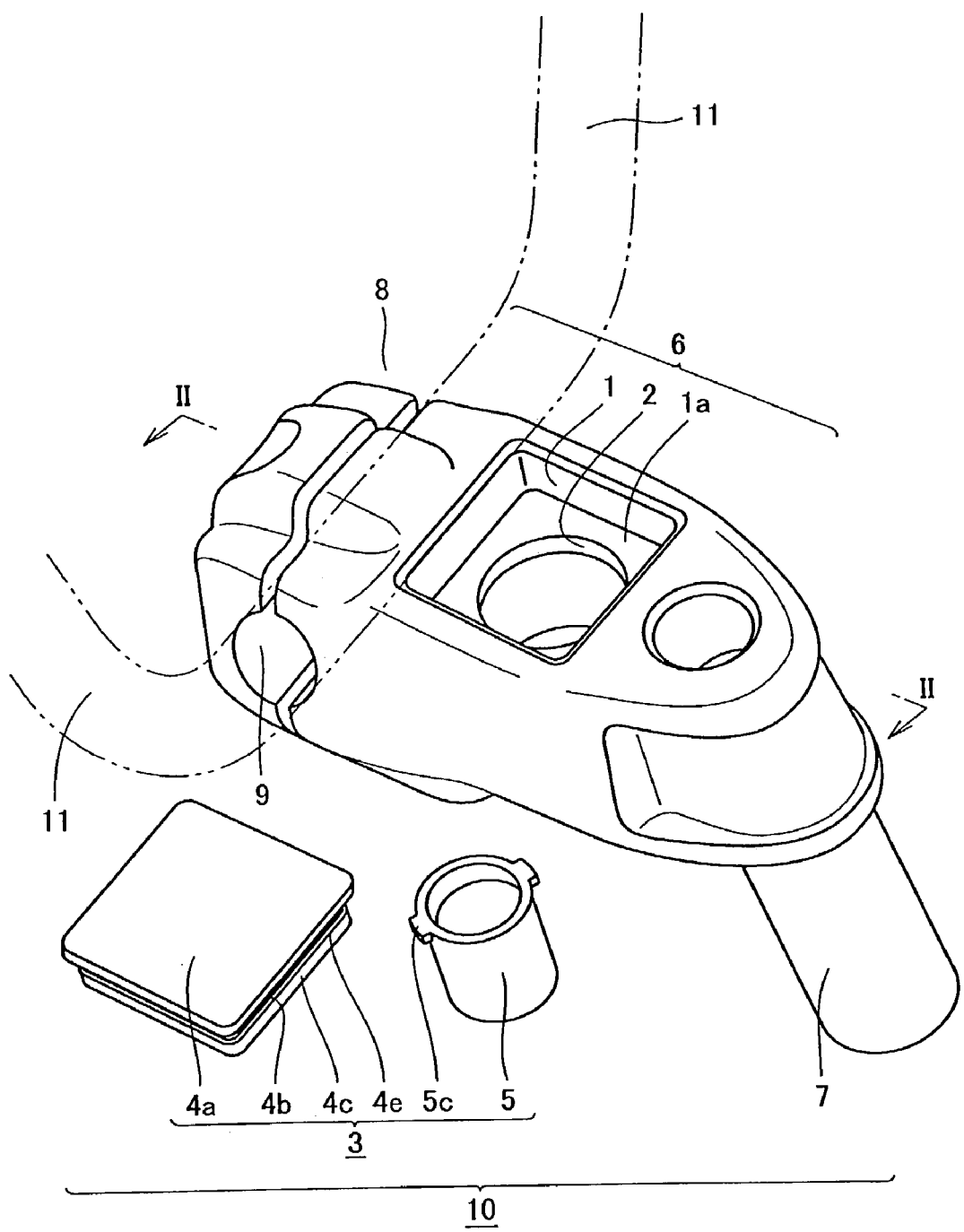
FIG. 1 is an exploded perspective view of a handle stem according to an embodiment of the present invention.

An embodiment of the present invention is now described in connection with the drawings. FIG. 1 is a perspective view of a handle stem according to an embodiment of the present invention. This handle stem 10 has a forward-projecting part 6 on the upper end of a hollow longitudinal rod 7. On the front end of forward-projecting part 6, a handle-bar holding part 8 having a handle-bar insertion hole 9 therein is placed to hold a handle bar 11. An indicator housing is provided at the center of forward-projecting part 6. The indicator housing is constituted of a housing recess 1 and a through hole 2 opening on a bottom surface 1a of the housing recess. An indicator 3 is constituted of a body 4 formed of a liquid-crystal display and a wiring board, and a battery housing 5. Body 4 has a transparent plate 4a for protection, a liquid-crystal part 4b, circuit board 4e and a bottom 4c insofar as they are seen in FIG. 1. Bottom 4c has an outward-projecting engagement part. Body 4 is fit in housing recess 1, and bottom 4c of the body and bottom surface 1a of the housing recess are bonded to each other with an adhesive and thus fixed. Battery housing 5 has a battery-case engagement tab 5c. Battery housing 5 is put in from below the through hole 2 to be engaged with an engagement part of the bottom of the body by this engagement tab and is accordingly attachable/detachable.

Figure 2:
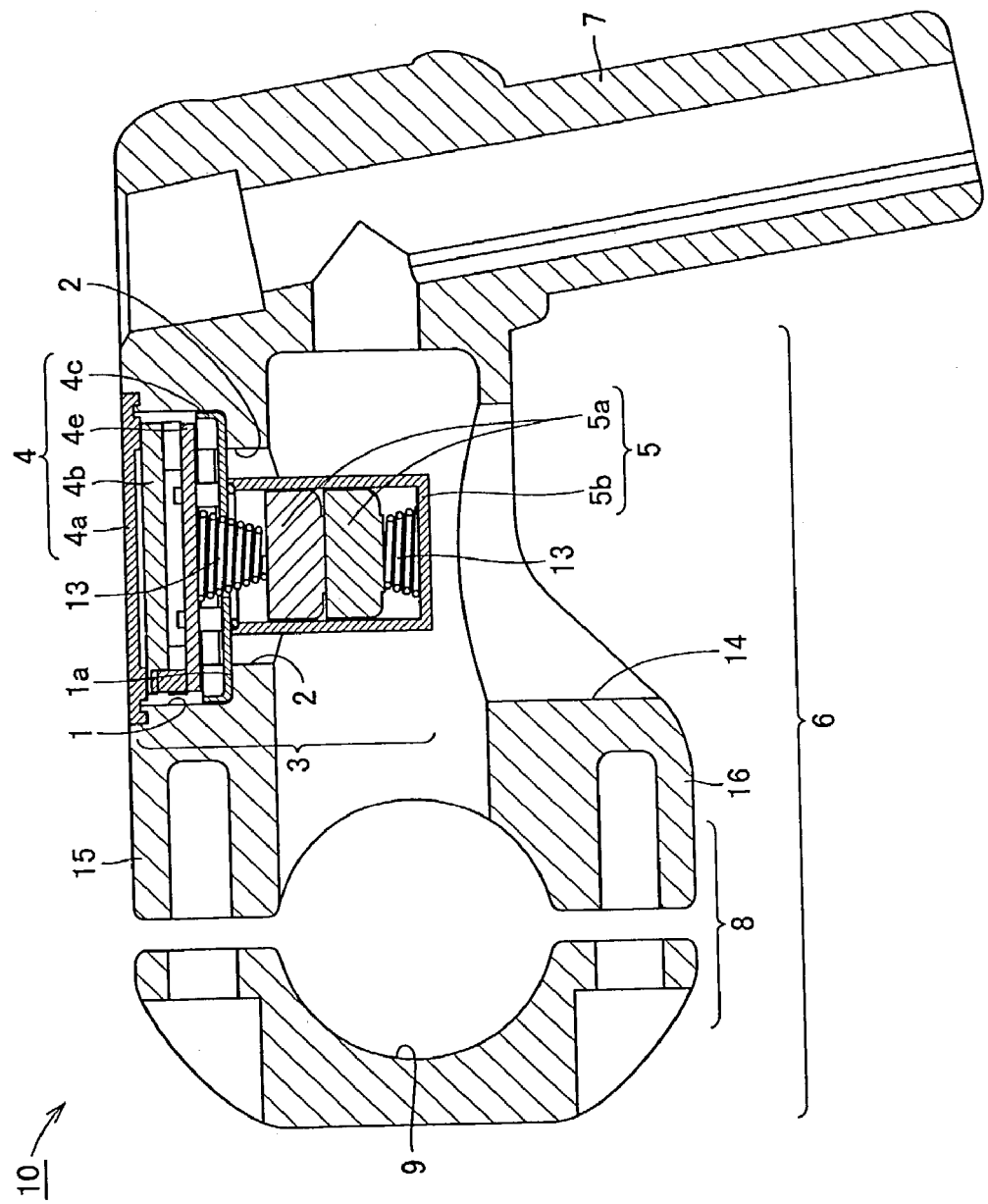
FIG. 2 is a cross-sectional view along line II—II in FIG. 1.

FIG. 2 is a cross-sectional view along line II—II in FIG. 1. Body 4 of liquid-crystal indicator 3 is fit in housing recess 1 at the center of the upper surface of forward-projecting part 6, and bottom 4c of body 4 is bonded to bottom surface 1a of the housing recess and accordingly fixed thereto. The rider can see indications on liquid-crystal part 4b through transparent plate 4a of indicator 3. Further, circuit board 4e is placed in body 4.

Through hole 2 opening on bottom surface 1a of housing recess 1 is provided so as to have clearance with respect to cylindrical battery housing 5. Two batteries 5a are housed in a battery case 5b of battery housing 5 to protrude downward from through hole 2. Forward-projecting part 6 has an upper portion 15 with a planar upper surface and a bottom portion 16. In forward-projecting part 6, a part of insertion hole 9 in which the handle bar is held as well as a space into which battery housing 5 protrudes downward are formed. Moreover, lower portion 16 has a housing-case attachment/detachment hole 14 for allowing battery case 5b of battery housing 5 to be freely attachable/detachable from below the forward-projecting part 6.

A spring 13 serves to ensure electrical connection of the batteries and to facilitate engagement of the composite unit made up of the batteries and the battery case with an engagement tab at the bottom of the body and strengthen the engaging force therebetween.

With the above-discussed structure, a hand or fingers can be inserted from hole 14 in lower portion 16 of forward-projecting part 6 of the handle stem to touch battery case 5b. Accordingly, detachment/attachment of the battery case from/to the bottom of the body by rotation of the battery case which houses batteries therein 5a can be facilitated. Further, the battery housing is placed within and below the handle stem so that only the indicator can be placed on the upper surface of the handle stem that is easy to see by the rider. In this way, the handle stem having the speed indicator placed thereon can be improved in terms of design.

Figure 3:
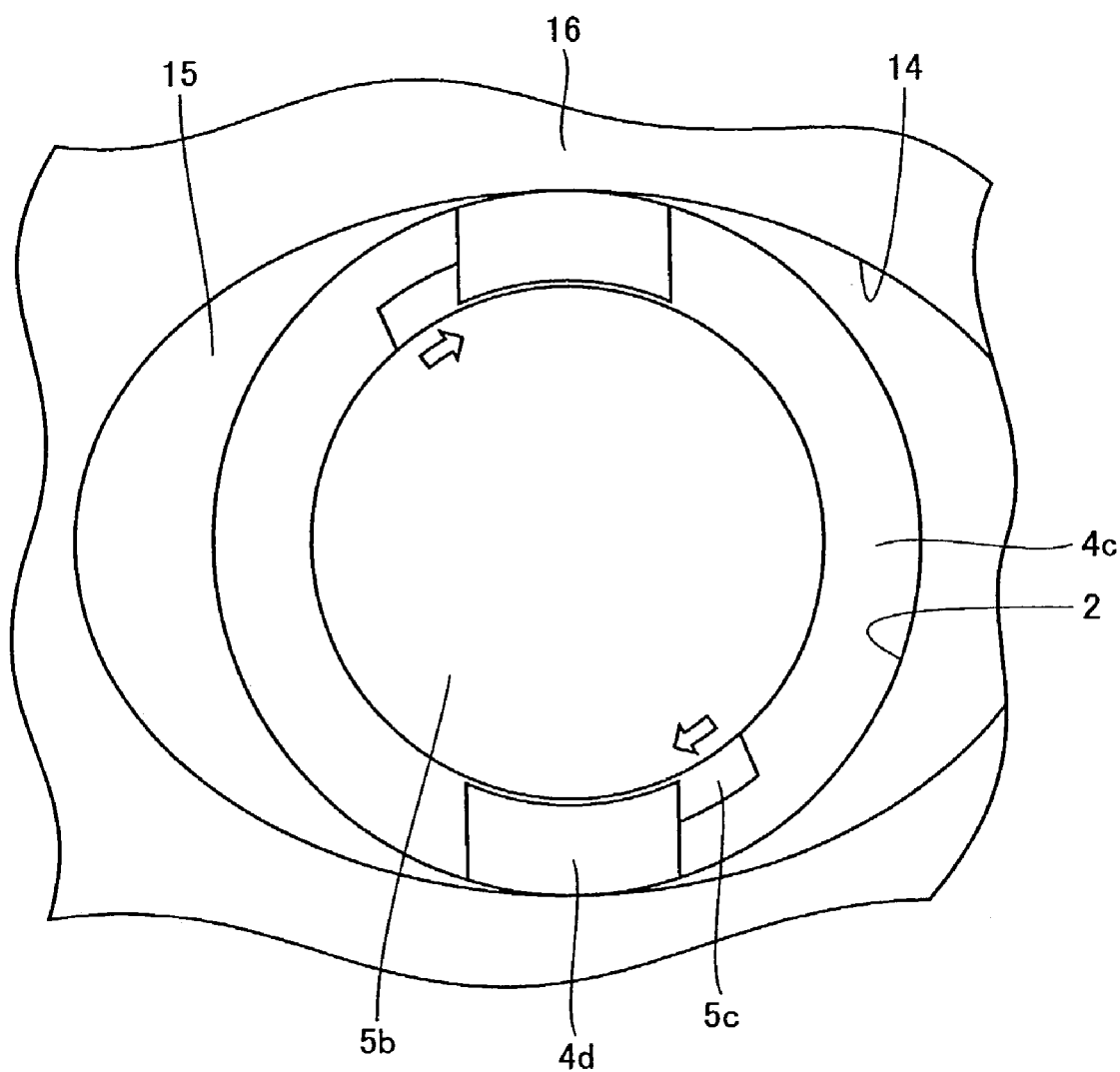
FIG. 3 shows a battery housing viewed from below a forward-projecting part of the handle stem in FIG. 2.

FIG. 3 shows the handle stem in FIG. 2 that is viewed from below. Lower portion 16 of the handle stem has hole 14 in the shape of an ellipse. The bottom surface of upper portion 15 is seen through elliptical hole 14 at the outermost area. Housing recess 1 of upper portion 15 has through hole 2. In FIG. 3, bottom 4c of the body is seen immediately inside the through hole 2. Bottom 4c of the body has an engagement part 4d which engages with an engagement tab 5c of the battery case. FIG. 3 shows a state that engagement tab 5c is now being engaged with engagement part 4d of the body.

Figure 4:
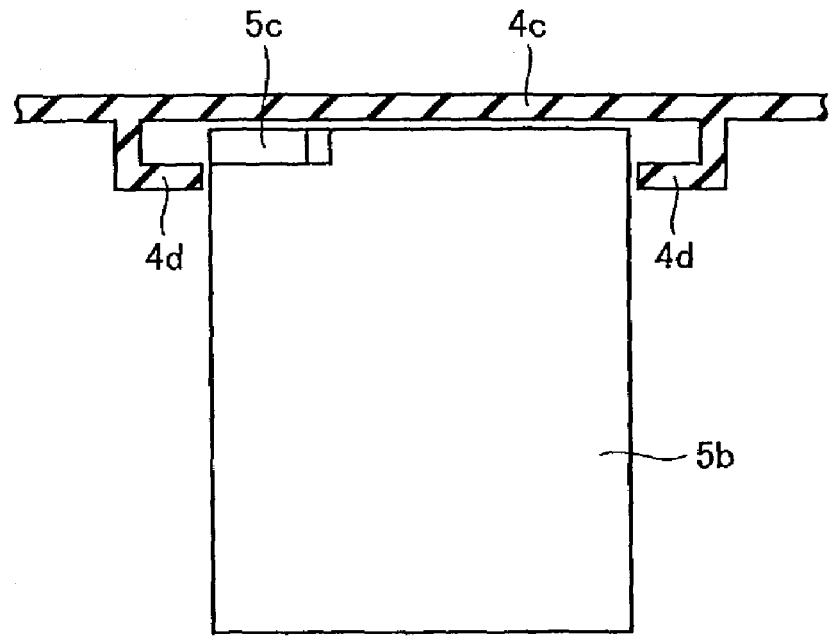
FIG. 4 is a cross-sectional view showing a state immediately before the battery case is engaged with the bottom of a body of an indicator.
Figure 5:
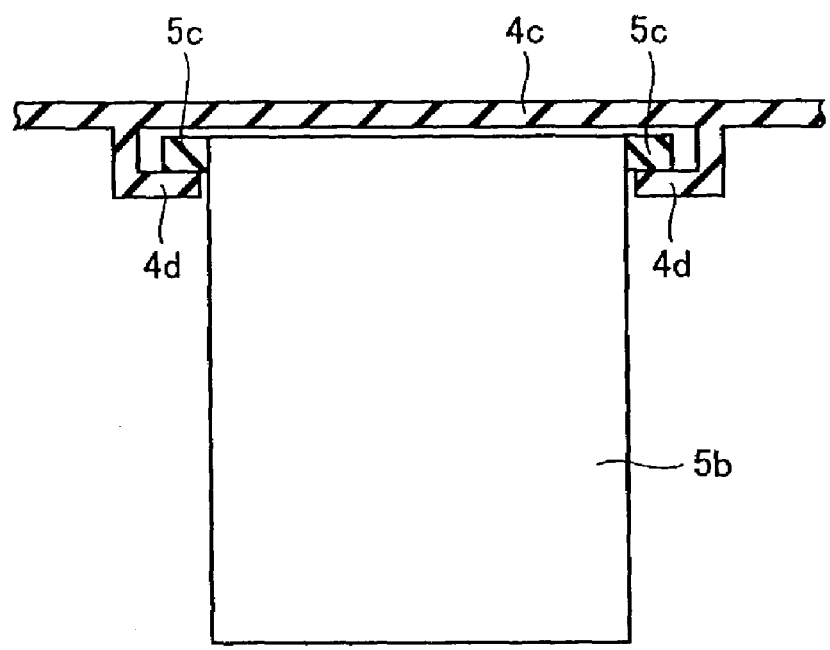
FIG. 5 is a cross-sectional view showing a state after the battery case is engaged with the bottom of the body of the indicator.
Figure 6:
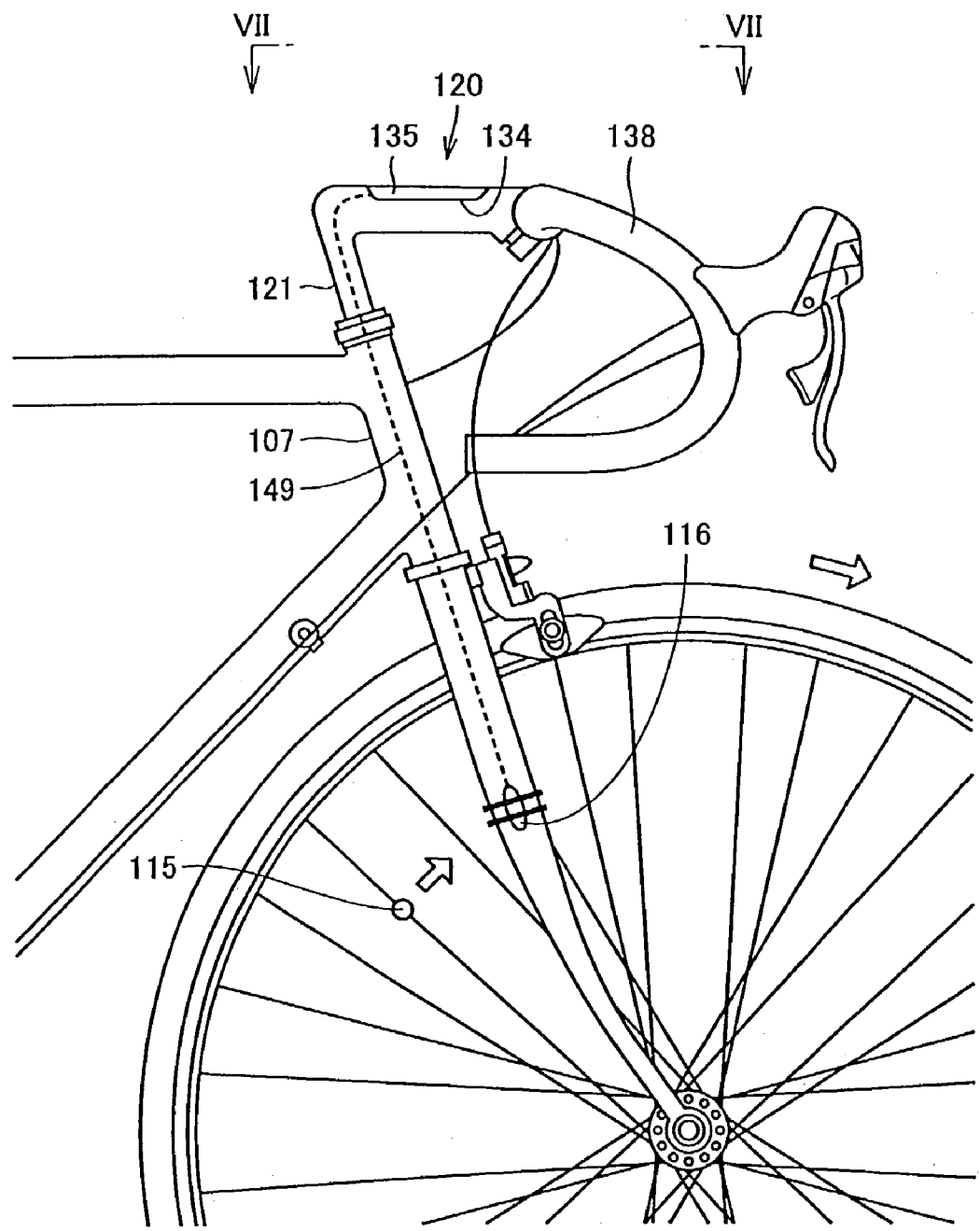
FIG. 6 shows a front part of a bicycle.
Figure 7:
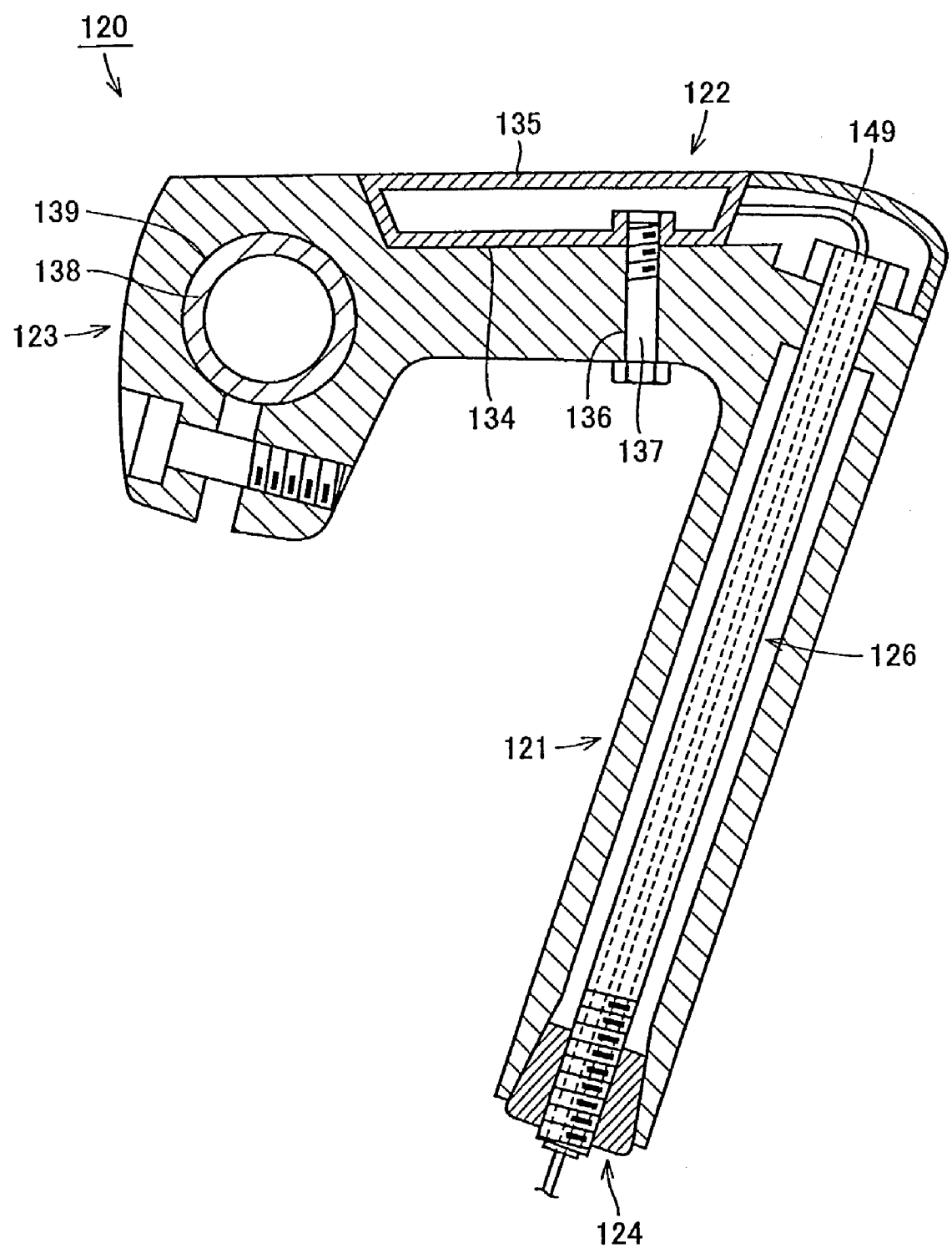
FIG. 7 is a cross-sectional view along line VII—VII of a handle stem in FIG. 6.

In FIGS. 4 and 5, engagement tab 5c is shown to be engaged with engagement part 4d of bottom 4c of the body 4 of the indicator. FIG. 4 shows a state before battery case 5b is rotated to allow engagement tab 5c to be engaged with engagement part 4d, and FIG. 5 shows a state in which the battery case is rotated to allow engagement tab 5c to be engaged with engagement part 4d of the body. Such attachment means of the battery housing as described above can be used to easily attach/detach the battery case from below the forward-projecting part of the handle stem by a simple operation.

Placement of the lead which electrically connects the speed indicator to the sensor has not been described in connection with this embodiment. According to the embodiment of the present invention, however, the lead may be of the type invisible from the outside by being passed through the handle stem and the head tube, or of the type placed to pass along the outside of the handle stem and the head tube.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A handle stem for use with a bicycle, comprising a speed indicator and an indicator housing portion having a recess formed therein said speed indicator being received in said recess, wherein said speed indicator being formed of a body including a circuit board and a liquid-crystal display and a battery housing detachable from the body, said battery housing has an open upper end and a closed downward end, and said body being fixed to said indicator housing so as to attach said speed indicator to said handle stem and allow said battery housing to be freely attachable/detachable, and said indicator housing portion having a through hole opening downward at the bottom of said recess, said body having, on the bottom thereof, an engagement part for engaging within said through hole, and said battery housing at the upper end having a battery-case engagement tab engaging with said engagement part in a fashion that said battery housing protrudes downward from said body and said through hole, and is attachable/detachable from below said handle stem by rotation of said battery housing.

2. The handle stem according to claim 1, wherein said body is fixed to said handle stem to be unable to be attached/detached.

3. A handle stem for a bicycle, comprising a forward-projecting part on the upper end of a hollow rod, a speed indicator and an indicator housing portion, which receives the speed indicator, wherein said speed indicator being formed of a body including a circuit board and a liquid-crystal display and a battery housing detachable from the body, said battery housing having an open upper end and a closed downward end, said indicator housing portion including a recess for receiving said body, said body being fixed to said indicator housing portion so as to attach said speed indicator to said handle stem and allow said battery housing to be freely attachable/detachable, said indicator housing portion having a through hole opening downward at the bottom of said recess, and said battery housing being formed as a protrusion and placed to protrude downward from said body and said through hole, and said battery housing being attachable/detachable from below said handle stem by rotation of said battery housing.

4. A handle stem as in claim 3, wherein complementary engagement means are provided on the body and the protrusion for attaching the protrusion with the body upon relative rotation of the parts in one direction and for detaching the protrusion and the body upon return relative rotation in the opposite direction.

5. A handle stem as in claim 4 wherein the complementary engagement means includes a engagement part on the body and an engagement tab on the protrusion.

* * * * *